W. H. C. DUDLEY, Jr.
KINETOSCOPE SHUTTER.
APPLICATION FILED FEB. 23, 1911.
1,011,593.
Patented Dec. 12, 1911.
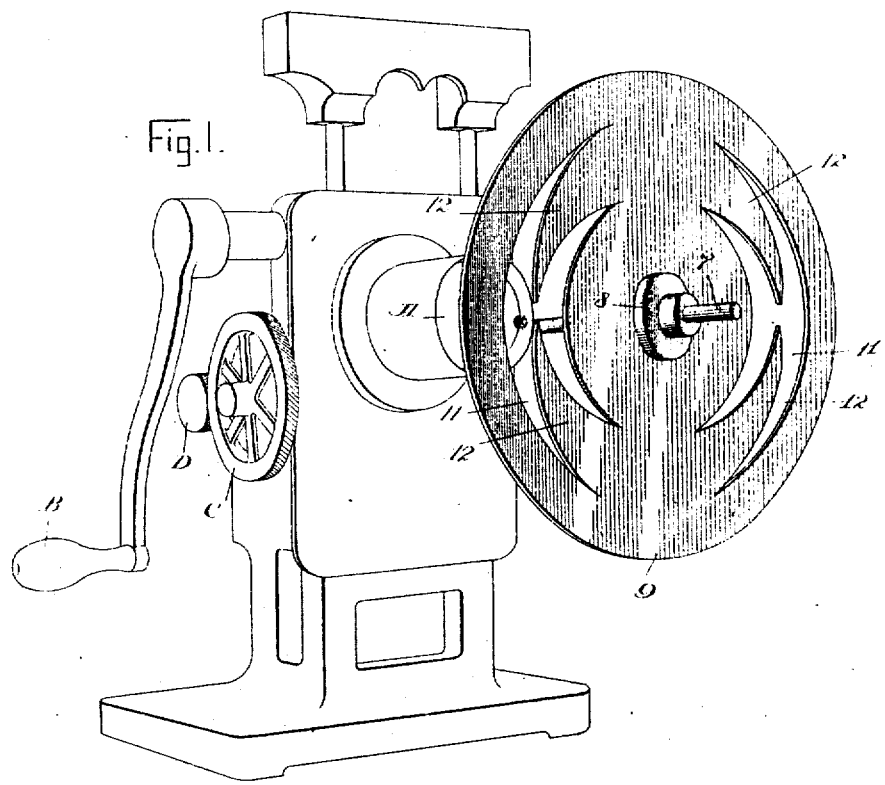
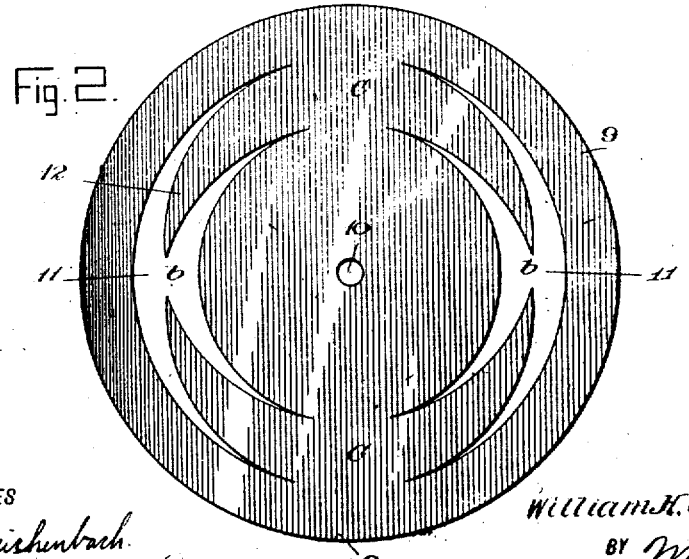
WITNESSES
INVENTOR
William H. C. Dudley Jr.
BY Munn & Co
ATTORNEYS

UNITED STATES PATENT OFFICE.

WILLIAM H. C. DUDLEY, JR., OF AMERICUS, GEORGIA.

KINETOSCOPE-SHUTTER.

1,011,593.   Specification of Letters Patent.   Patented Dec. 12, 1911.

Application filed February 23, 1911. Serial No. 610,206.

*To all whom it may concern:*

Be it known that I, WILLIAM H. C. DUDLEY, Jr., a citizen of the United States, and a resident of Americus, in the county of Sumter and State of Georgia, have invented a new and Improved Kinetoscope-Shutter, of which the following is a full, clear, and exact description.

The principal object which the present invention has in view is to provide a shutter the operation whereof produces an obscuration known as fading, and an illumination of a similar character.

With this object in view the invention consists in constructing a rotary disk to travel in front of the projecting lens of a moving picture machine, having formed in the path of the light, one or more elongated curved openings, said openings being divided lengthwise from the median section of each opening by means of tongue-like members, said members being gradually increased in width toward the obscuration sections of the disk.

One embodiment of the present invention is disclosed in the structure illustrated in the accompanying drawings, in which like characters of reference denote corresponding parts in both views, and in which—

Figure 1 is a perspective view of a kinetoscope head, showing in conjunction therewith a shutter constructed and arranged in accordance with the present invention; and Fig. 2 is a side view of a shutter constructed and arranged in accordance with the present invention.

The "head" shown in the drawings is of usual construction, having a projecting lens A and an operating crank handle B. Connected with a train of gear wheels C and D is a counter shaft which crosses to the opposite side of the head from that shown in Fig. 1, and is there suitably connected with the shaft 7. Fixedly clamped on the shaft 7 by means of a washer 8 is a circular disk 9. The disk 9 is constructed of any suitable material, such as blackened cardboard, or, if desired, suitable light-weight metal. The center of the disk 9 is provided with a perforation 10 through which is extended the shaft 7. Disposed on opposite sides of the center of the disk 9 are the light openings 11, 11. The openings 11 are constructed substantially as shown in Fig. 2 of the drawings and are divided centrally by tongues 12. The tongues 12 are extended from the full light area *b* to the complete obscuration area *c*. The length of the distance between the points on the tongues 12 and the base lines of the tongues 12 is formed to provide the proportionate light and dark periods desired in moving picture work. By reason of the shape of the tongues 12 it will be noted that the light is obscured from the center of the lens A to travel laterally on the horizontal diameter of the said lens. In other words, the shadow cast by the obscuring tongue would divide the light on the "spot" or lighted area of the screen, laterally, the greatest amount of light on the "spot" being at the edges thereof on the horizontal diameter.

The gradual fading and lighting of the "spot" when the photograph or transparency is being exposed produce the effect of fading the picture, and thus avoids the flickering objectionably noticeable in moving picture exhibitions. By so fading and developing the picture the shutter works in harmony with the retina of the human eye.

Having thus described my invention, what I claim as new and desire to secure by Letters Patent is:—

1. As an article of manufacture, a rotary disk shutter, having concentrically arranged an open slot, and provided with a pointed tongue extending lengthwise of said slot, said tongue extending across the slot at the end thereof to form at each side of said tongue two openings, the edges whereof are converged toward the base of the tongue.

2. As an article of manufacture, a rotary disk shutter, having concentrically arranged an open slot, and provided with a plurality of pointed tongues oppositely extended in said slot, the converged ends whereof are adjacently disposed, and said tongues being shaped to extend across said slot at the base of said tongues to form on opposite sides of said tongues gradually contracted passages.

3. As an article of manufacture, a rotary disk shutter, having concentrically arranged a plurality of open slots equidistant from the center of said disk and provided in each slot with a pointed tongue.

4. As an article of manufacture, a rotary disk shutter, having concentrically arranged a plurality of open slots equidistant from the center of said disk and provided in each slot with a plurality of tongues, said tongues being pointed and extended from the median area of said slots.

In testimony whereof I have signed my name to this specification in the presence of two subscribing witnesses.

WILLIAM H. C. DUDLEY, Jr.

Witnesses:
N. M. DUDLEY,
T. M. ELDRIDGE.